United States Patent
Borchtchoukova et al.

(10) Patent No.: US 12,230,809 B2
(45) Date of Patent: Feb. 18, 2025

(54) NICKEL-BASED CATALYST FOR FUEL CELL ANODE

(71) Applicant: GENCELL LTD., Petah Tikva (IL)

(72) Inventors: Nino Borchtchoukova, Modiin (IL); Yair Haim Wijsboom, Kiryat Ono (IL); Gennadi Finkelshtain, Modiin (IL); Margarita Valentinova Gabrovska, Sofia (BG); Dimitrinka Aleksieva Nikolova, Sofia (BG)

(73) Assignee: GENCELL LTD., Petah Tikva (IL)

( * ) Notice: Subject to any disclaimer, the term of this patent is extended or adjusted under 35 U.S.C. 154(b) by 132 days.

(21) Appl. No.: 17/769,410

(22) PCT Filed: Oct. 15, 2020

(86) PCT No.: PCT/US2020/055738
§ 371 (c)(1),
(2) Date: Apr. 15, 2022

(87) PCT Pub. No.: WO2021/076730
PCT Pub. Date: Apr. 22, 2021

(65) Prior Publication Data
US 2024/0128472 A1    Apr. 18, 2024

Related U.S. Application Data

(60) Provisional application No. 62/916,837, filed on Oct. 18, 2019.

(51) Int. Cl.
*H01M 4/90* (2006.01)
*H01M 4/88* (2006.01)
*H01M 8/083* (2016.01)

(52) U.S. Cl.
CPC ....... *H01M 4/9041* (2013.01); *H01M 4/8846* (2013.01); *H01M 4/9083* (2013.01);
(Continued)

(58) Field of Classification Search
CPC ............. H01M 4/8817; H01M 4/8846; H01M 4/9041; H01M 4/9075; H01M 4/9083; H01M 8/083; Y02E 60/50
See application file for complete search history.

(56) References Cited

U.S. PATENT DOCUMENTS 11,289,710 B1    3/2022  Atanassov et al.
2009/0130502 A1*  5/2009  Liu ..................... H01M 4/9083
                                                      429/483
(Continued)

FOREIGN PATENT DOCUMENTS

JP    2009129881 A    6/2009
JP    2014192098 A    10/2014
(Continued)

OTHER PUBLICATIONS

Miller, Hamish A. et al., "A Pd/C—CeO2 Anode Catalyst for High-Performance Platinum-Free Anion Exchange Membrane Fuel Cells", Angew. Chem. Int. Ed., 2016, vol. 55, pp. 6004-6007 (published online on Apr. 8, 2016).
(Continued)

Primary Examiner — Lingwen R Zeng
(74) Attorney, Agent, or Firm — Abel Schillinger, LLP

(57) ABSTRACT

A catalyst which is suitable for use in an anode of a fuel cell. The catalyst comprises, in at least partially reduced form, (i) nickel and (ii) molybdenum and, optionally, (iii) rhenium and/or (iv) at least one transition metal which is different from nickel, molybdenum and rhenium, supported on (v) electrically conductive carbon modified with one or more elements selected from the lanthanides, yttrium, tin and titanium. The weight ratio (i):((ii)+(iii)+(iv)) is at least 2:1.

20 Claims, 1 Drawing Sheet

(52) U.S. Cl.
CPC ........ *H01M 4/8817* (2013.01); *H01M 4/9075* (2013.01); *H01M 8/083* (2013.01); *Y02E 60/50* (2013.01)

(56) References Cited

U.S. PATENT DOCUMENTS

| | | |
|---|---|---|
| 2009/0139502 A1 | 5/2009 | Liu et al. |
| 2011/0207972 A1 | 8/2011 | Brown et al. |

FOREIGN PATENT DOCUMENTS

| | | |
|---|---|---|
| KR | 20190025259 A | 3/2019 |
| KR | 1020190025259 A | 3/2019 |
| KR | 102010406 B1 | 8/2019 |
| WO | 2011106046 A1 | 9/2011 |
| WO | 2015069068 A1 | 5/2015 |

OTHER PUBLICATIONS

Miller, Hamish A. et al., "Highly active nanostructured palladium-ceria electrocatalysts for the hydrogen oxidation reaction in alkaline medium", Nano Energy, 2017, vol. 33, pp. 293-305 (available online on Jan. 26, 2017).

M.K. Nazal et al., Precious metal free Ni/Cu/Mo trimetallic nanocomposite supported on multi-walled carbon nanotubes as highly efficient and durable anode-catalyst for alkaline direct methanol fuel cells, Journal of Electroanalytical Chemistry, May 28, 2018, vol. 823, pp. 98-105.

* cited by examiner

NICKEL-BASED CATALYST FOR FUEL CELL ANODE

CROSS-REFERENCE TO RELATED APPLICATIONS

The present application claims priority of U.S. Provisional Patent Application No. 62/916,837, filed Oct. 18, 2019, the entire disclosure of which is expressly incorporated by reference herein.

BACKGROUND OF THE INVENTION

1. Field of the Invention

The present invention relates to a nickel-based catalyst for the anode of a fuel cell and in particular, an alkaline fuel cell. The invention also relates to a process for making the catalyst and to an anode which comprises the catalyst.

2. Discussion of Background Information

A fuel cell (FC) is one of the oldest electrochemical devices that generate electricity, heat and water by direct electrochemical reaction of a hydrogen-rich fuel with oxygen without any harmful emissions and therefore in an extremely environmentally friendly way. The direct generation of electricity allows FCs to be highly energy efficient. FCs have been deployed as an alternative power generation technique for the future in both mobile and stationary applications, ranging from toys to scale power stations and plants, from vehicles to mobile chargers, and from household power to battlefield power. FCs are generally classified according to the nature of the electrolyte: alkaline fuel cells (AFC), proton-exchange membrane fuel cells (PEMFCs), solid oxide fuel cells (SOFCs), phosphoric acid fuel cells (PACFs) and molten carbonate fuel cells (MCFCs), each with its own characteristic, each type requiring particular materials and fuel. However, they all comprise the same essential components, namely anode support, anode catalyst layer, electrolyte, cathode support, cathode catalyst layer, bipolar plates/interconnects and sometimes gaskets for sealing/preventing leakage of gases between anode and cathode. Each fuel cell type also has its own operational characteristics, offering advantages to particular applications. This makes fuel cells a very versatile technology.

AFCs show promise as environmentally friendly electrochemical power sources for distributed cogeneration for building, and transportation applications. The traditional AFCs operate on compressed hydrogen and oxygen and generally use a solution of potassium hydroxide in water as their electrolyte. AFCs use a liquid KOH electrolyte solution because it is the most conductive of all alkaline hydroxides, and also an effective heat transfer and water management medium. In these cells, hydroxyl ions ($OH^-$) migrate from the cathode to the anode. The hydrogen fuel is supplied continuously to the anode compartment and an oxidant (often oxygen from air) is fed continuously to the cathode compartment. At the anode, oxygen gas reacts with water to produce $OH^-$ ions and release electrons. Electrons generated at the anode supply electrical power to an external circuit, then return to the cathode. There the electrons react with oxygen and water to produce more $OH^-$ ions that diffuse into the electrolyte. AFCs operate at efficiencies up to 70 percent and create little pollution. Because they produce potable water in addition to electricity, they have been a logical choice for spacecraft. The electrical voltage between the anode and the cathode is in the range 0.5-0.9 V, depending on the load and the electrochemical reactions.

For the low and intermediate temperature FCs, platinum and platinum group metals, either as alone (Pt/C) or in combination of two or more thereof, as well as their corresponding alloys have been preferred as ideal materials suitable for use as electrocatalysts for both the hydrogen oxidation reaction (HOR) and the oxygen reduction reaction (ORR) due to the high capacity and performance in any media. However, the cost of Pt and the limited world supply are significant barriers to the widespread use of these types of fuel cells. Accordingly, a large-scale production and application of noble metal catalysts in practical FCs is limited due to the scanty world resources and high cost.

Attempts have been made to replace platinum partially or completely by transition metal compositions as anodes for AFCs that would retain performance in fuel cell electrodes without being too expensive. Apart from lower cost, another advantage of transition metal catalysts is their low susceptibility to poisoning.

Palladium is the most attractive replacement for platinum because these two metals have very similar properties (same group of the Periodic Table, same fcc crystal structure, similar atomic size, etc.). In the past (but not currently) the cost of palladium was lower than that of platinum. Palladium is at least fifty times more abundant on the earth than platinum. For these reasons, palladium has been tested in fuel cells as a platinum co-catalyst and/or as a platinum-free anode catalyst in alkaline media. It has been reported that addition of metals like Co, Ru, Mn and especially Ni significantly promotes the activity and stability of Pd/C electrocatalysts.

A variety of inexpensive non-noble metal materials (e.g., Fe, Co, and Ni) for fuel cell components has already been employed as well. The catalytic activity of nickel as the anode catalyst is about three orders of magnitude lower than that of platinum. That performance deficit can be remedied to some extent with a much higher electrode loading of the less expensive catalyst, by enlarging the active area using finely divided particles and otherwise optimizing the electrode structure. With regard to this, nickel-containing composites such as nickel boride ($Ni_2B$) have been widely used as anode materials, because nickel metal is highly conductive and corrosion resistant to potassium hydroxide and demonstrates unique catalytic activity for the hydrogen oxidation reaction (HOR). The Raney-nickel catalyst, which is among the most active non-noble metals for the HOR, has been the target of interest, especially in AFCs. However, electrodes with Raney-nickel catalysts without support have been reported to suffer from insufficient conductivity. Therefore, in order to enhance the electrical conductivity in the catalyst layer and to increase the catalytic activity, Raney-nickel catalysts were alloyed with carbon material. Raney-nickel hydrogen electrodes containing nickel alone as a transition metal component show relatively large polarizations, a time-dependent behavior and high electrolyte diffusion resistance due to low pore volume and small pore size. These problems have been circumvented by doping the starting Ni—Al alloy with a small percentage of transition metals such as Ti, Cr, Fe and Mo prior to extraction by KOH. Different methods of preparations of the active metal both without and with metal dopants (Ti, Mo, Fe, Cr, Cu) have been proposed and reported in the literature aiming to overcome the mentioned difficulties.

Metal hydride (MH) alloys and intermetallic compounds such as $MmNi_{3.5}Co_{0.7}Al_{0.7}Mn_{0.1}$ and $MlNi_{3.65}Co_{0.85}Al_{0.3}Mn_{0.3}$ (Ml: La-rich mischmetal) also have been tested for use as anode catalysts in AFCs. They are characterized by good electrochemical properties, mechanical and chemical stabilities in alkaline electrolyte.

According to scientific articles and patents published in recent years, the nickel-containing catalysts continue to be applied as the most promising materials for preparation of the anode electrodes in the $H_2$—$O_2$ AFCs. In some AFCs the anode catalyst material consists of 65% of nickel and 35% of aluminum with 1% of carbon black and 7% of PTFE as bonding agents (see, e.g., JP 2007-087924 A, the entire disclosure of which is incorporated herein). In other AFCs an electrode is obtained by applying a catalyst carrying Ni, Co, and Fe on carbon fine particles to the surface of nickel foam. PTFE is used as a binder (see, e.g., US 2009/0004521 A1, the entire disclosure of which is incorporated herein). In yet another AFC, the anode catalyst layer comprises nickel and the cathode catalyst layer comprises silver. An also present $CO_2$ inhibitor is in the form of a polymer-bound $CO_2$ adsorbent. In particular, the catalyst layer of the anode electrode promotes $CO_2$ desorption (see, e.g., US 2010/0239921 A1, the entire disclosure of which is incorporated herein).

In view of the foregoing, it would be advantageous to be able to replace the platinum metal used for the production of an anode electrocatalyst with a non-platinum metal such as a transition d-metal without significantly decreasing the electrochemical activity of the catalyst.

SUMMARY OF THE INVENTION

The present invention provides a catalyst which is suitable for use in an anode of a fuel cell and in particular, an alkaline fuel cell. The catalyst comprises, in at least partially reduced (metallic) form, (i) nickel and (ii) molybdenum and, as optionally present elements, (iii) rhenium and/or (iv) at least one transition metal which is different from nickel, molybdenum and rhenium. The weight ratio (i):((ii)+(iii)+(iv)) is at least 2:1. Components (i), (ii) and optionally (iii) and/or (iv) are supported on (v) electrically conductive carbon which is modified with one or more elements selected from the lanthanides, yttrium, tin and titanium (e.g., in the form of $TiO_2$).

In one aspect of the catalyst, component (iii) may be present. In another aspect, component (iv) may be present. In yet another aspect, components (iii) and (iv) may be present. Component (iv) may, for example, comprise one or both of cobalt and tungsten.

In another aspect, the electrically conductive carbon may be modified by one or more lanthanides selected from cerium and lanthanum and/or by yttrium and/or by tin, preferably in partly or substantially completely oxidized form (i.e., in the form of oxides). Cerium is preferred as modifying element. For example, the one or more elements modifying the electrically conductive carbon may be present in a (total) concentration of at least 0.5% by weight, based on the total weight of modified electrically conductive carbon and calculated as pure metal(s).

In another aspect of the catalyst of the present invention, the catalyst may comprise, based on the total weight of components (i) to (v), at least 10% by weight of component (i) and/or at least 0.5% by weight and not more than 5% by weight of component (ii) and/or at least 0.5% by weight and not more than 5% by weight of component (iii) and/or at least 0.5% by weight and not more than 5% by weight of component (iv).

In yet another aspect, the catalyst of the present invention may be substantially free of Pt and in particular, may be substantially free of any of Pt, Ru, Rh, Ag, and Au (and preferably also free of Pd, Ir and Os). In another aspect, the catalyst may (also) be substantially free of Al and preferably substantially free of all other main group metals (with the exception of yttrium and tin).

In another aspect of the catalyst of the present invention, the support (v) may have a specific surface area of at least 50 $m^2$/g and/or at least 50% of the particles thereof may have a particle size of not higher than 30 μm.

In another aspect, the catalyst of the present invention may be obtainable by a process which comprises impregnating component (v) with one or more solutions of compounds of nickel and molybdenum and, optionally one or more solutions of compounds of rhenium and/or one or more solutions of one or more compounds of transition metals which are different from nickel, molybdenum and rhenium, followed by an at least partial reduction of the metals present.

The present invention further provides an anode for a fuel cell (preferably an alkaline fuel cell), which anode comprises the catalyst of the present invention as set forth above, including the various aspects thereof, as well as a fuel cell which comprises this anode.

The present invention further provides a process for making the catalyst of the present invention as set forth above. The process comprises an impregnation of component (v) with one or more solutions of compounds of nickel and molybdenum and, optionally one or more solutions of compounds of rhenium and/or one or more solutions of one or more compounds of transition metals which are different from nickel, molybdenum and rhenium, followed by an at least partial (and preferably substantially complete) reduction of the impregnating metals present.

In one aspect of the process, the impregnation (or at least an impregnation with one of the solutions employed) may be carried by the incipient wetness technique.

In yet another aspect of the process, the reduction may be preceded by a drying operation and optionally, a calcination operation.

In a still further aspect of the process, the at least partial reduction may be carried out with hydrogen, preferably in the presence of urea.

The present invention further provides a process for making an anode that is suitable for use in a fuel cell. This process comprises mixing the catalyst of the instant invention as set forth above (including the various aspects thereof) with a binder and forming the resultant mixture into a ribbon (e.g. by rolling), followed by combining the ribbon (usually under pressure) with a current collector (e.g., by pressing) to form the anode material (which may be cut into pieces of desired dimensions for the anode). The binder may, for example, comprise polytetrafluoroethylene. The current collector may, for example, comprise a metal grid such as, e.g., a nickel grid.

The present invention further provides an electrical device that is in contact with a fuel cell according to the present invention as set forth above, as well as a method of powering an electrical device, which method comprises establishing electrical contact between the device and a fuel cell of the present invention as set forth above.

BRIEF DESCRIPTION OF THE DRAWINGS

The present invention is further described in the detailed description which follows, in reference to the accompanying drawings by way of non-limiting examples of exemplary embodiments of the present invention. In the drawings.

DETAILED DESCRIPTION OF THE PRESENT INVENTION

Figure 1:
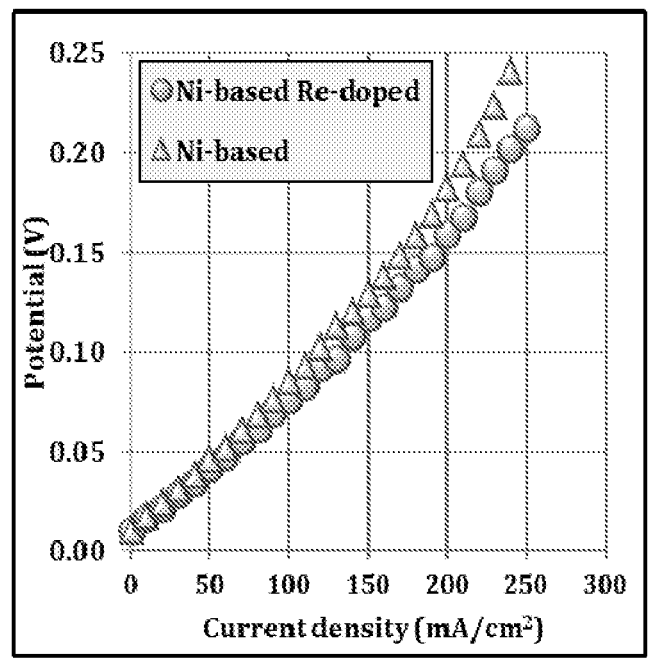
FIG. 1 shows graphs of current density vs. applied potential on a half cell test bench employing the electrocatalysts obtained as described in the Examples 1 and 2 below.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a," "an," and "the" include the plural reference unless the context clearly dictates otherwise. For example, reference to "a transition metal" would also mean that mixtures of two or more transition metals can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the present specification and the appended claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from 1 to 50, it is deemed to include, for example, 1, 7, 34, 46.1, 23.7, or any other value or range within the range.

The catalyst of the present invention comprises, in at least partially (and preferably substantially completely reduced=metallic) form, nickel and molybdenum and optionally also rhenium and/or one or more (e.g., 1, 2 or 3) transition metals which are different from nickel, molybdenum and rhenium. Examples of suitable transition metals include Y, Ti, Zr, Hf, V, Nb, Ta, Cr, Mo, W, Mn, Fe, Co, Cu, Zn, Cd. Preferred transition metals are Co and W. The additional presence of Re is particularly preferred. It also is preferred for the catalyst to be substantially free of Pt. It is even more preferred for the catalyst to be substantially free of any of Pt, Pd, Ru, Rh, Ag, Au. For example, the catalyst may be substantially free of any of Pt, Ru, Rh, Ag, Au, Pd, Os, Ir. It is also preferred for the catalyst to be substantially free of Al or any other main group metal which is different from yttrium and tin (which latter metals may be present in the carbon support). The term "substantially free" as used herein and in the appended claims is intended to mean that not more than 0.1%, e.g., not more than 0.05%, not more than 0.01%, or not more than 0.001% by weight, based on the total weight of the metals and the electrically conductive carrier present in the catalyst of the present invention, of a corresponding metal is present in the catalyst. It also is preferred for the catalyst of the present invention to essentially consist of, or to consist of, components (i), (ii) and (v), components (i), (ii), (iii) and (v), components (i), (ii), (iv) and (v) or components (i), (ii), (iii), (iv) and (iv).

The weight ratio component (i):components ((ii)+(iii)+(iv)) is preferably at least 2.5:1, e.g., at least 3:1, at least 3.5:1, or at least 4:1, based on pure metals and regardless of whether or not components (iii) and/or (iv) are present. This weight ratio is usually not higher than 20:1, e.g., not higher than 15:1, not higher than 10:1, or not higher than 8:1.

Based on the total weight of components (i) to (v) the catalyst of the present invention preferably comprises, calculated as pure metal, at least 10%, e.g., at least 12%, at least 15%, at least 18%, or at least 20% by weight of nickel. The concentration of nickel will usually not exceed 30% by weight, although higher concentrations (usually not higher than 50% by weight) are possible.

Based on the total weight of components (i) to (v) the catalyst of the present invention preferably comprises, calculated as pure metal, at least 0.5%, e.g., at least 1%, at least 1.5%, at least 2%, or at least 2.5% by weight of molybdenum. The concentration of molybdenum will usually not exceed 5% by weight, although higher concentrations are possible.

If component (iii) is present, the catalyst of the present invention preferably comprises, based on the total weight of components (i) to (v) and calculated as pure metal, at least 0.5%, e.g., at least 1%, at least 1.5%, at least 2%, or at least 2.5% by weight of rhenium. The concentration of rhenium will usually not exceed 5% by weight, although higher concentrations are possible.

If component (iv) is present, the catalyst of the present invention preferably comprises, based on the total weight of components (i) to (v) and calculated as pure metal(s), at total of at least 0.5%, e.g., at least 1%, at least 1.5%, at least 2%, or at least 2.5% by weight of one or more transition metals which are different from Ni, Mo and Re. The total concentration of these transition metals will usually not exceed 5% by weight, although higher concentrations are possible.

Based on the total weight of components (i) to (v) the catalyst of the present invention preferably comprises at least 50%, e.g., at least 55%, at least 60%, at least 65%, or at least 70% by weight of component (v), although higher and lower concentrations than those stated are possible. The one or more elements modifying the electrically conductive carbon will usually be present in a (total) concentration of at least 0.5% by weight, e.g., at least 1% by weight, or at least 2% by weight, but preferably not more than 20%, e.g., not more than 15%, not more than 10%, or not more than 5% by weight, based on the total weight of modified electrically conductive carbon and calculated as pure metal(s).

The support of the catalyst of the present invention preferably has a specific surface area (measured according to the BET method with nitrogen gas) of at least 50 $m^2/g$, e.g., at least 100 $m^2/g$, at least 200 $m^2/g$, or at least 300 $m^2/g$. There is no particular upper limit for the specific surface area, but apparently with increasing specific surface area of the support the handling of the support will become more difficult.

The support will usually have a particle size (applying to at least 90% of all particles) which is not smaller than about 0.5 μm, e.g., not smaller than about 1 μm, not smaller than about 5 μm, or not smaller than about 10 μm, and not higher than about 100 μm, e.g., not higher than about 80 μm, or not higher than about 70 μm. It is preferred that at least 50% of the support particles have a particle size of not higher than 30 μm, e.g., not higher than 25 μm, or not higher than 20 μm.

Electrically conductive carbon materials which are suitable for the purposes of the present invention are available from many commercial sources. Non-limiting examples of suitable commercially available products are sold under the tradenames Vulcan XC-72, Vulcan P90, Black Pearls 2000, Black Pearls 450, Black Pearls 570, Regal 400, Regal 330 (all available from Cabot, USA), Picatif SC 10 (available from Pica USA Inc, Columbus, Ohio), Norit GSX, Norit SX Plus, Norit DLC Supra (available from Norit, Netherlands), carbon AKC, HSAG-300CAT (available from Lonza, Switzerland) and Sibunit (available from the Institute of Technical Carbon, Omsk, Russia; see also U.S. Pat. No. 4,978,649, the entire disclosure of which is incorporated by reference herein).

The catalyst of the present invention can be prepared by many different methods which are know to those of skill in the art. According to a preferred method, the support (v) is impregnated by contacting it with a (preferably aqueous or aqueous/alcoholic) solution of the corresponding metal compounds (usually metal salts of an inorganic acid such as the nitrates and halides or, especially in the case of molybdenum and rhenium, in the form of complex salts such as molybdates and rhenates such as ammonium molybdates and ammonium rhenates). Preferably, the impregnation takes place by the incipient wetness technique, usually followed by drying and optionally by calcination. Drying may be carried out at a temperature of, for example, in the range of from 60° C. to 120° C., whereas the calcination will usually be carried out at a temperature of e.g., from 200° C. to 400° C. The dried and optionally calcined support is then subjected to a reduction. A preferred reducing agent is hydrogen gas (usually diluted with an inert gas such as nitrogen). In this case the reduction is usually carried out at elevated temperature (e.g., in the temperature range of from about 400° C. to about 600° C.). The reduction with hydrogen gas is preferably carried out in the presence of urea. A preferred weight ratio of impregnated metals (Ni+Mo+optional metals):urea is from 1:1 to 1:4, e.g., from 1:1.5 to 1:2.5.

An anode for a fuel cell can be made from the nickel containing catalyst of the present invention in a conventional manner well known to those skilled in the art. Merely by way of example, a material comprising the catalyst of the present invention and a binder (e.g., PTFE) may be rolled into a ribbon. The ribbon may be pressed onto a current collector such as a metal (e.g. nickel) grid.

The material comprising the Ni-based catalyst of the present invention may be employed as the anode of a fuel cell and in particular, an alkaline fuel cell. The cathode of the fuel cell may be any cathode that can be used in combination with an (alkaline) fuel cell. Examples thereof are well known to those skilled in the art.

The structure of a typical fuel cell according to the present invention comprises an anode which in its operative state is in contact with a fuel (e.g. hydrogen gas) on one side, and is in contact with a liquid electrolyte (e.g., an aqueous alkali metal hydroxide, preferably aqueous KOH) on its other side, and a cathode which also is in contact with the liquid electrolyte on one side thereof. The other side of the cathode is in contact with an oxidant, preferably oxygen, air or any other oxygen containing gas.

The fuel cell of the present invention can be used to supply electrical energy to a virtually unlimited number of electric and electronic devices.

EXAMPLES

Example 1

Synthesis of 50 g of catalyst 27.0% Ni-3.0% Mo-70.0% support ($CeO_2$-modified carbon)

Solution 1

66.906 g $Ni(NO_3)_2 \cdot 6H_2O$ was placed in a glass beaker and dissolved in 50 ml of deionized water under vigorous stirring with a magnetic stirrer without heating until full dissolution.

Solution 2

2.762 g $(NH_4)_6Mo_7O_{24} \cdot 4H_2O$ was placed in a glass beaker and dissolved in 50 ml deionized water under vigorous stirring with a magnetic stirrer without heating until full dissolution.

Solutions 1 and 2 were mixed, diluted to 150 ml with deionized water and stirred to obtain a homogeneous solution.

Impregnating the modified support with the mixed Ni—Mo solution was carried out by stepwise impregnation followed by drying at 105° C. according to the incipient wetness technique. After the last impregnation the sample was calcined at 300° C. for 120 min, followed by a reduction with hydrogen (5-10% $H_2$ in $N_2$) at 520° C. for 180 min in the presence of urea (weight ratio (Ni+Mo)/urea=½).

The modification of the electrically conductive carbon (S88) with $CeO_2$ was carried out according to the procedure disclosed in Hamish A. Miller et al., Nano Energy 33 (2017) pp. 293-305, the entire disclosure of which is expressly incorporated by reference herein.

Example 2

Synthesis of 25 g of catalyst 27.0% Ni-3.0% Mo-2.5Re-67.5% support ($CeO_2$-modified carbon)

Solution 1

33.4502 g $Ni(NO_3)_2 \cdot 6H_2O$ was placed in a glass beaker and dissolved in 40 ml of deionized water under vigorous stirring with a magnetic stirrer without heating until full dissolution.

Solution 2

1.3805 g $(NH_4)_6Mo_7O_{24} \cdot 4H_2O$ was placed in a glass beaker and dissolved in 25 ml deionized water under vigorous stirring with a magnetic stirrer without heating until full dissolution.

Solutions 1 and 2 were mixed, diluted to 100 ml with deionized water and stirred to obtain a homogeneous solution.

Solution 3

0.9012 g $NH_4ReO_4$ was placed in a glass beaker and dissolved in 50 ml deionized water under vigorous stirring with a magnetic stirrer without heating until full dissolution.

Impregnating the modified support with the mixed Ni—Mo solution was carried out by stepwise impregnation, followed by drying at 105° C. according to the incipient wetness technique. After the last impregnation the sample was calcined at 300° C. for 120 min., followed by impregnation with Solution 3. The thus impregnated sample was dried overnight at 105° C. and then reduced with hydrogen (5-10% $H_2$ in N 2) at 520° C. for 180 min.

The modified electrically conductive carbon was the same as in Example 1 above.

Example 3

Synthesis of 25 g of catalyst 22.5% Ni-2.5% Mo-2.5Re-72.5% support (CeO$_2$-modified carbon)

Solution 1

27.8731 g Ni(NO$_3$)$_2$·6H$_2$O was placed in a glass beaker and dissolved in 40 ml of deionized water under vigorous stirring with a magnetic stirrer without heating until full dissolution.

Solution 2

1.1500 g (NH$_4$)$_6$MO$_7$O$_{24}$·4H$_2$O was placed in a glass beaker and dissolved in 25 ml deionized water under vigorous stirring with a magnetic stirrer without heating until full dissolution.

Solutions 1 and 2 were mixed, diluted to 100 ml with deionized water and stirred to obtain a homogeneous solution.

Solution 3

0.9018 g NH$_4$ReO$_4$ was placed in a glass beaker and dissolved in 50 ml deionized water under vigorous stirring with a magnetic stirrer without heating until full dissolution.

Impregnating the modified support with the mixed Ni—Mo solution was carried out by stepwise impregnation followed by drying at 105° C. according to the incipient wetness technique. After the last impregnation the sample was calcined at 300° C. for 120 min., followed by impregnation with Solution 3 according to the incipient wetness technique. The thus impregnated sample was dried overnight at 105° C. and then reduced with hydrogen (5-10% H$_2$ in N$_2$) at 520° C. for 180 min.

The modified electrically conductive carbon was the same as in Example 1 above.

Preparation of Anode 25 g of the above reduced catalyst was mixed with polytetrafluorethylene (PTFE) at a weight ratio catalyst/PTFE of 80/20. Mixing was carried out at room temperature with a blender for about 5 min.

The resultant mixture of catalyst and PTFE was placed into a rolling device to make a ribbon. The produced catalyst ribbon was placed on a nickel grid (wire diameter 0.14 mm, aperture size 0.4×0.4 mm) and pressed thereon, yielding the anode material. The ribbon was cut into anode pieces of 17 cm$^2$.

Testing of Anode

The anode was tested by a Volt-Ampere Curve (VAC) on a half-cell test bench (HCTB). A Volt-Ampere Curve (VAC) obtained in a galvanostatic measurement gives the best preliminary estimation of the electrode's performance. The galvanostatic experiment simulates the real conditions and loads on the cathode in a fuel cell.

The HCTB provides a constant 6M KOH electrolyte circulation that is thermostatically controlled at 70° C. The anode is tested in a half-cell equipped with counter and reference electrodes. The anode is gas-liquid electrode, i.e., on one side it is covered by liquid electrolyte and on the other side it is exposed to a hydrogen gas atmosphere. The half-cell has a gas chamber on the gas side of a working electrode. The HCTB also provides a hydrogen flow at the desired pressure and flow rate, and the working gas (H$_2$) can be replaced with inert gas (N$_2$). VAC is measured by current staircase scanning of 0<I<250 mA/cm 2 which aims at setting fixed current steps and monitoring the potential of an electrode. The measured steady potential in every galvanostatic step is plotted vs. current density to obtain the Volt-Ampere Characteristics.

Figure 2:
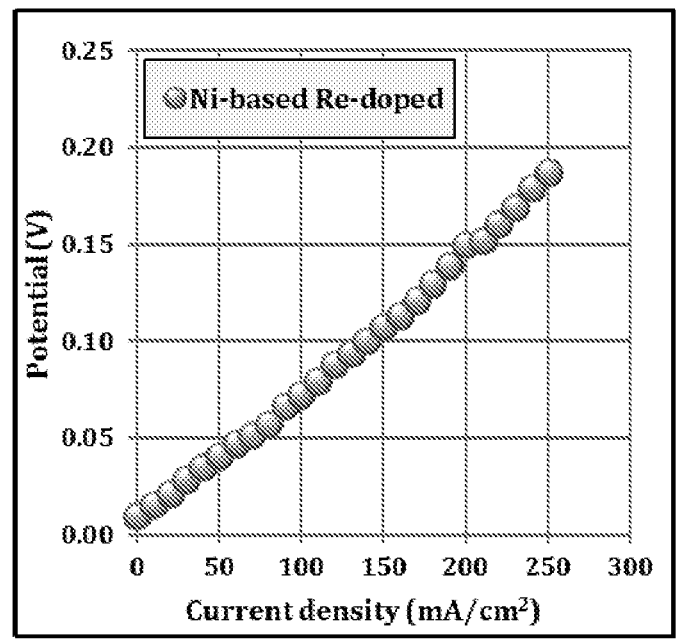
FIG. 2 shows a graph of current density vs. applied potential on a half cell test bench employing the electrocatalyst obtained as described in the Example 3 below.

FIG. 1 shows VACs of anodes comprising the Re-free and Re-doped catalysts prepared as described in Examples 1 and 2 above. FIG. 2 shows a VAC of an anode comprising the Re-doped catalyst prepared as described in Example 3 above.

It is noted that in cases where the anode does not immediately respond to hydrogen exposure a simple electrochemical activation process may, for example, be applied: using an external power supply a current of 5 mA/cm 2 for 30 minutes may be applied to the fuel cell in a two electrode setup.

The anode is connected to the negative polarity and the cathode is connected to the positive polarity. The cell voltage should be monitored constantly as the voltage should not exceed 1.2V to prevent the cathode, counter electrode, to be over-oxidized.

To sum up, the present invention provides the following items:

1. A catalyst for an anode of a fuel cell, wherein the catalyst comprises, in at least partially reduced form, (i) nickel and (ii) molybdenum and, optionally, (iii) rhenium and/or (iv) at least one transition metal which is different from nickel, molybdenum and rhenium, supported on (v) electrically conductive carbon modified with one or more elements selected from the lanthanides, yttrium, tin, and titanium, the weight ratio (i): ((ii)+(iii)+(iv)) being at least 2:1.
2. The catalyst of item 1, wherein (iii) is present.
3. The catalyst of any one of items 1 and 2, wherein (iv) is present.
4. The catalyst of item 3, wherein (iv) comprises at least one of cobalt and tungsten.
5. The catalyst of any one of items 1 to 4, wherein the lanthanide comprises at least one of cerium and lanthanum.
6. The catalyst of any one of items 1 to 5, wherein the electrically conductive carbon is modified with cerium.
7. The catalyst of any one of items 1 to 6, wherein the one or more elements modifying the electrically conductive carbon are at least in part present as oxides.
8. The catalyst of any one of items 1 to 7, wherein the one or more elements modifying the electrically conductive carbon are present in a concentration of at least 0.5% by weight, based on the total weight of modified electrically conductive carbon.
9. The catalyst of any one of items 1 to 8, wherein the catalyst comprises at least 10% by weight of (i), based on a total weight of (i) to (v).
10. The catalyst of any one of items 1 to 9, wherein the catalyst comprises at least 0.5% by weight of (ii), based on a total weight of (i) to (v).
11. The catalyst of any one of items 1 to 10, wherein the catalyst comprises not more than 5% by weight of (ii).
12. The catalyst of any one of items 1 to 11, wherein the catalyst comprises at least 0.5% by weight of (iii), based on a total weight of (i) to (v).
13. The catalyst of any one of claims 1 to 12, wherein the catalyst comprises not more than 5% by weight of (iii).
14. The catalyst of any one of items 1 to 13, wherein the catalyst comprises at least 50% by weight of (v), based on a total weight of (i) to (v).
15. The catalyst of any one of items 1 to 14, wherein the catalyst is substantially free of Pt, Pd, Ru, Ag, and Au.
16. The catalyst of any one of items 1 to 15, wherein the catalyst is obtainable by a process which comprises impregnating component (v) with one or more solutions of compounds of nickel and molybdenum and, optionally one or more solutions of compounds of rhenium and/or one or more solutions of one or more compounds of transition metals which are different from nickel, molybdenum and rhenium, followed by an at least partial reduction of the metals present.

17. An anode for a fuel cell, wherein the anode comprises the catalyst of any one of items 1 to 16.
18. A fuel cell, wherein the fuel cell comprises the anode of item 17.
19. A process for making the catalyst of any one of items 1 to 16, wherein the process comprises impregnating component (v) with one or more solutions of compounds of nickel and molybdenum and, optionally one or more solutions of compounds of rhenium and/or one or more solutions of one or more compounds of transition metals which are different from nickel, molybdenum and rhenium, followed by an at least partial reduction of the metals present.
20. The process of item 19, wherein the impregnation is carried out by an incipient wetness technique.
21. The process of any one of items 19 and 20, wherein the reduction is preceded by a drying operation and optionally, a calcination operation.
22. The process of any one of items 19 to 21, wherein the at least partial reduction is carried out with hydrogen.
23. The process of item 22, wherein the reduction is carried out in the presence of urea.
24. An electrical device, wherein the device is in electrical contact with the fuel cell of item 18.
25. A method of powering an electrical device, wherein the method comprises establishing electrical contact between the device and the fuel cell of item 18.

What is claimed is:

1. A catalyst for an anode of a fuel cell, wherein the catalyst comprises, in at least partially reduced form, (i) nickel and (ii) molybdenum and, optionally, (iii) rhenium and/or (iv) at least one transition metal which is different from nickel, molybdenum and rhenium, supported on (v) electrically conductive carbon modified with one or more elements selected from the lanthanides, yttrium, tin, and titanium, a weight ratio (i):((ii)+(iii)+(iv)) being at least 2:1.
2. The catalyst of claim 1, wherein (iii) is present.
3. The catalyst of claim 1, wherein (iv) is present.
4. The catalyst of claim 1, wherein (iii) and (iv) are present.
5. The catalyst of claim 3, wherein (iv) comprises at least one of cobalt and tungsten.
6. The catalyst of claim 1, wherein the lanthanide comprises at least one of cerium and lanthanum.
7. The catalyst of claim 1, wherein the electrically conductive carbon is modified with cerium.
8. The catalyst of claim 1, wherein the one or more elements modifying the electrically conductive carbon are at least in part present as oxides.
9. The catalyst of claim 1, wherein the one or more elements modifying the electrically conductive carbon are present in a concentration of at least 0.5% by weight, based on a total weight of modified electrically conductive carbon.
10. The catalyst of claim 1, wherein the catalyst comprises at least 10% by weight of (i), based on a total weight of (i) to (v).
11. The catalyst of claim 1, wherein the catalyst comprises at least 0.5% by weight of (ii), based on a total weight of (i) to (v).
12. The catalyst of claim 11, wherein the catalyst comprises not more than 5% by weight of (ii).
13. The catalyst of claim 1, wherein the catalyst comprises at least 0.5% by weight of (iii), based on a total weight of (i) to (v).
14. The catalyst of claim 13, wherein the catalyst comprises not more than 5% by weight of (iii).
15. The catalyst of claim 11, wherein the catalyst comprises at least 0.5% by weight of (iii), based on a total weight of (i) to (v).
16. The catalyst of claim 1, wherein the catalyst comprises at least 50% by weight of (v), based on a total weight of (i) to (v).
17. The catalyst of claim 1, wherein the catalyst is substantially free of Pt, Pd, Ru, Ag, and Au.
18. An anode for a fuel cell, wherein the anode comprises the catalyst of claim 1.
19. A fuel cell, wherein the fuel cell comprises the anode of claim 18.
20. A process for making the catalyst of claim 1, wherein the process comprises impregnating component (v) with one or more solutions of compounds of nickel and molybdenum and, optionally, one or more solutions of compounds of rhenium and/or one or more solutions of one or more compounds of transition metals which are different from nickel, molybdenum and rhenium, followed by an at least partial reduction of the metals present.

* * * * *